(12) United States Patent
Uramoto et al.

(10) Patent No.: US 6,243,032 B1
(45) Date of Patent: Jun. 5, 2001

(54) DECODE APPARATUS THAT CAN ACCOMMODATE DYNAMIC CHANGE IN SAMPLE DATA ATTRIBUTE DURING DECODING PROCESS

(75) Inventors: Shinichi Uramoto; Tetsuya Hara, both of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/399,368

(22) Filed: Sep. 20, 1999

(30) Foreign Application Priority Data

Mar. 19, 1999 (JP) .................................................. 11-075898

(51) Int. Cl.[7] .................................................. H03M 1/00
(52) U.S. Cl. .......................... 341/110; 348/515; 348/512; 348/518; 348/416; 348/423; 348/558; 709/500; 709/502; 709/503; 709/200; 382/232; 382/236; 382/238; 382/276; 382/246; 340/347; 360/13; 386/54; 375/260; 375/316
(58) Field of Search .................................. 341/50, 65, 61, 341/67, 144, 141, 110, 155; 348/515, 416, 512, 518, 423, 558, 568; 382/232, 236, 238, 276, 246; 704/502, 503, 200, 500

(56) References Cited

U.S. PATENT DOCUMENTS

| | | | | |
|---|---|---|---|---|
| 4,937,875 | * | 6/1990 | Hayashi | 381/63 |
| 5,479,168 | * | 12/1995 | Johnson et al. | 341/110 |
| 5,732,155 | * | 3/1998 | Saito | 382/232 |
| 5,872,531 | * | 2/1999 | Johnson et al. | 341/110 |
| 6,088,063 | * | 7/2000 | Shiba | 348/515 |
| 6,091,555 | * | 7/2000 | Nagai et al. | 360/13 |
| 6,094,638 | * | 7/2000 | Ema et al. | 704/502 |
| 6,128,349 | * | 10/2000 | Chow | 375/260 |

FOREIGN PATENT DOCUMENTS

| | | |
|---|---|---|
| 9-9205 | 1/1997 | (JP) . |
| 9-312839 | 12/1997 | (JP) . |

* cited by examiner

*Primary Examiner*—Michael Tokar
*Assistant Examiner*—Lam T. Mai
(74) *Attorney, Agent, or Firm*—McDermott, Will & Emery

(57) ABSTRACT

An A/V signal pickup unit receives an audio digital data stream. A CPU carries out a decode process, and adds tag data indicating the attribute of audio sample data to provide the same to an audio signal converter unit. The audio signal converter unit controls the timing of the output operation of sample data according to the tag data.

19 Claims, 14 Drawing Sheets

DECODE APPARATUS THAT CAN ACCOMMODATE DYNAMIC CHANGE IN SAMPLE DATA ATTRIBUTE DURING DECODING PROCESS

BACKGROUND OF THE INVENTION

1. Field of the Invention

The present invention relates to the structure of an audio decode apparatus receiving a stream of audio digital data recorded digitally or transmitted as a digital signal to decode the same into a digital signal that can be converted into an analog audio signal.

2. Description of the Background Art

In accordance with the progress of the recent digital information compression technique, digital information is recorded/reproduced according to a standard such as the MPEG 2 (Moving Picture Experts Group 2) as the standard of coding audio and motion pictures (video), for example, into digital signals for multiplexing into audio video signals.

The coding system of a digital audio signal is not limited to the aforementioned MPEG audio. For example, the coding system of AC-3 (Audio Coding-3) employed in the DVD (Digital Video Disc) is known.

The decode apparatus of the systems corresponding to the above-described coding methods commonly decode a stream of audio digital data such as the MPEG and AC-3 and also generate an audio signal converted into a digital signal according to pulse code modulation (referred to as PCM hereinafter). In the following, these digital audio signals are referred to as "PCM audio signal", and audio information converted into such PCM audio signals is referred to as "PCM audio data".

FIG. 12 is a schematic block diagram showing a structure of a conventional audio decoder 5000.

Conventional audio decoder 5000 includes an audio signal decode unit 5011 receiving audio sample data read out from a recording medium of digital audio signals such as a DVD to apply a decoding process, and an audio signal converter unit 5013 receiving the signal from audio signal decode unit 5011 via a data buffer 5012 to convert the same into an audio digital signal that can be converted into an analog audio signal.

In many cases, audio signal decode unit 5011 is formed of a digital signal processor (referred to as DSP hereinafter) or a S/W signal processing block that carries out a decoding process by software such as a microcomputer.

For example, when the audio sample data is a multi-channel signal, the time series data (serial data) output from audio decode unit 5011 is provided to a plurality of digital-analog converters (referred to as "D/A converter" hereinafter) corresponding to each channel by audio signal converter unit 5013.

FIG. 13 is a schematic block diagram showing a structure of audio sample data output from audio signal decode unit 5011.

In FIG. 13, time is plotted along the horizontal direction.

More specifically, audio sample data output from audio signal decode unit 5011 corresponds to the continuation of data of 6 channels as time series data. Data 21a–21f correspond to channels 1–6, respectively, followed by sample data 21g–21k corresponding to channels 1–5, respectively.

Data corresponding to the data of each channel is referred to as PCM audio data 32 hereinafter.

Examples of such multichannel audio data include the AC-3 multichannel signal, i.e., data formed of audio data of 5 channels and low frequency effect audio (LFE).

When PCM audio data (audio sample data) which is the time series data shown in FIG. 13 is decode-processed by audio signal decode unit 5011 and then applied to audio signal converter unit 5013 directly as time series data, problems set forth in the following will be encountered.

In a CD and the like which is the recording medium of conventional digital audio signals, the sampling frequency fs of each audio sample data is 48 kHz. The quantizing accuracy thereof is 16 bits.

In the DVD specification, the sampling frequency fs is 96 kHz or 192 kHz, in addition to the aforementioned 48 kHz.

As to the quantizing accuracy, 20 bits or 24 bits are employed in addition to the aforementioned 16 bits.

Some DVD specifications have copy protection specified with respect to the audio sample data. In this case, the audio signal decode unit may have to carry out the decoding process with the sampling frequency fs forced to 48 kHz and the quantizing accuracy forced to 16 bits.

As to music information recorded on a DVD, for example, some have the former part of the melody not subjected to copy protection, and the latter part of the melody subjected to copy protection.

Furthermore, if attribute information such as application of copy protection is not transferred together with the PCM audio data applied to audio signal converter unit 5013, the digital signal output from the audio signal converter unit may not be able to correspond to the dynamic change, if any, in the attribute of the audio data.

When error occurs and resynchronization is to be applied after initiating audio sample data transfer, there was a problem that audio decode unit 5011, buffer 5012 and audio converter unit 5013 must be initialized to restart the transfer.

This problem in resynchronization will be described in further detail.

FIG. 14 is a schematic diagram to describe the structure of a program stream which is the signal read out from a digital audio video recording medium such as a DVD.

For example, a presentation time stamp (referred to as PTS hereinafter) indicating the time when the audio elementary stream is to be reproduced as the system clock time and an audio elementary stream or video elementary stream corresponding to the PTS are included in time series in the program stream.

The information amount of video signals is generally considerably greater than the information amount of audio signals. Therefore, the audio elementary stream is included intermittently in the program stream.

The audio elementary stream is further divided into various frame data. Each frame is formed of a header and audio data.

The audio data includes a plurality of the above-described audio sample data.

If audio decode apparatus 5000 cannot apply resynchronization without initialization of the system when error occurs during the reproduction of the audio data according to the structure shown in FIG. 14, there is a problem that the deviating state in the reproduction timing between the audio information and the video information or discontinuation in the audio will continue for a long period of time.

SUMMARY OF THE INVENTION

An object of the present invention is to provide an audio decode apparatus that can accommodate dynamic change in the attribute of audio sample data.

Another object of the present invention is to realize a highly robust audio decode apparatus even when the control condition and the like change caused by error generation and the like.

According to an aspect of the present invention, a decode apparatus to apply a decode process on an audio digital data stream transmitted in units of frame data including a plurality of coded sample data is provided. The decode apparatus includes an interface unit, a decoder unit, a storage unit, and an audio signal converter unit.

The interface unit receives an audio digital data stream. The decoder unit sequentially decodes the audio digital data stream to add tag data indicating the sample data attribute to the sample data. The storage unit receives and buffers the decoded data.

The audio signal converter unit receives the data from the storage unit to convert the received data into a digital signal that can be converted into an audio analog signal by digital/analog conversion. The audio signal converter unit controls the timing of data output according to the tag data.

According to another aspect of the present invention, a decode apparatus to apply a decode process on an audio digital data stream transmitted in units of frame data including a plurality of coded sample data, and including frame attribute data indicating the attribute of at least one frame data is provided. The decode apparatus includes an interface unit, a decoder unit, a first storage unit, a second storage unit, and an audio signal converter unit.

The interface unit receives an audio digital data stream. The decoder unit sequentially decodes the audio digital data stream to separate frame attribute data and add the tag data indicating the sample data attribute to the sample data.

The first storage unit receives and buffers the frame attribute data from the decoder unit. The second storage unit receives and buffers the decoded sample data and tag data.

The audio signal converter unit receives the data from the storage unit to convert the same into a digital signal that can be converted into an audio analog signal by digital/analog conversion. The audio signal converter unit controls the timing of the data output according to the frame attribute data and tag data.

A main advantage of the present invention is that the audio signal converter unit can accommodate dynamic change in the audio sample data attribute since tag data indicating the attribute thereof is added to the sample data.

Another advantage of the present invention is that the audio signal converter unit can carry out a resynchronization operation properly even when the attribute of the audio sample data is changed dynamically since tag data indicating the attribute thereof is added to the sample data and the data indicating the attribute for each frame data is applied as frame attribute information.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
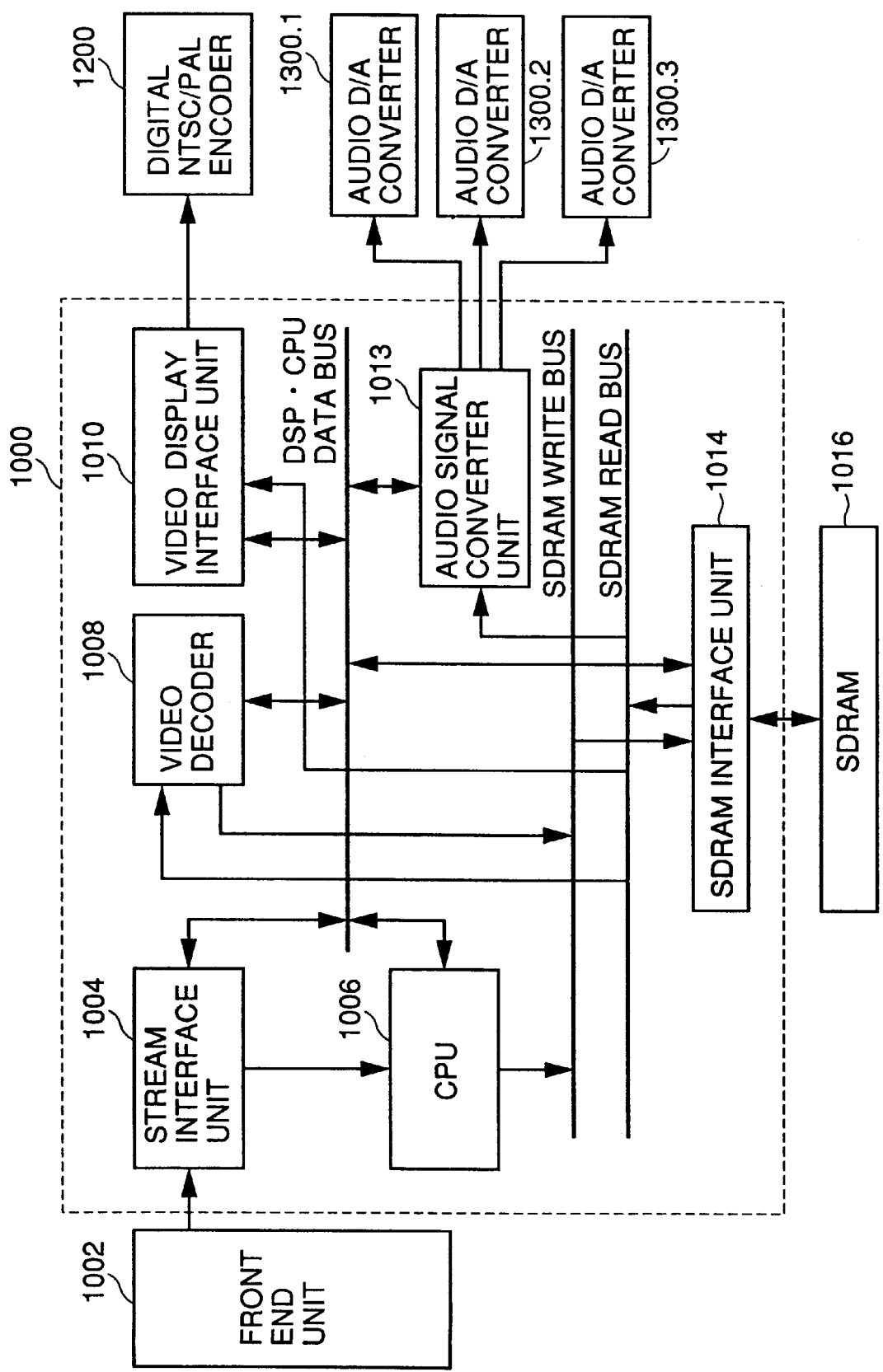
FIG. 1 is a schematic block diagram to describe a structure of an audio•video signal decode apparatus 1000 according to a first embodiment of the present invention.

Referring to FIG. 1, an audio video signal decode apparatus 1000 according to a first embodiment of the present invention includes a stream interface unit 1004 reading out an A/V signal from a recording medium such as a DVD and receiving a signal from a front end unit 1002 that applies signal processing such as error correction for conversion into data of a bit length suitable for a decode process, a CPU 1006 receiving data from stream interface unit 1004 to divide the same into a video signal stream and an audio signal stream, to carry out an audio decode process, and to control the operation timing of the hardware, a video decoder 1008 receiving via a DSP•CPU data bus the video stream signal divided at CPU 1006 to apply a decode process, and a video display interface unit 1010 receiving a decoded video signal from video decoder 1008 to output the same to a digital NTSC/PAL encoder 1200.

Audio video signal decode apparatus 1000 further includes an audio signal converter unit 1013 receiving an audio signal decoded by CPU 1006 to convert the same into a digital signal that will be applied to respective audio D/A converters 1300.1–1300.3, and a SDRAM interface 1014 to send/receive data to/from a synchronous dynamic semiconductor memory device (referred to as SDRAM hereinafter) 1016 that operates as the buffer of audio data or an elementary stream buffer of a video signal.

Here, audio signal converter unit 1013, for example, receives PCM audio sample data from SDRAM 1016 functioning as a data buffer. When the output audio data is multiaudio data of 6 channels, data is applied to each of audio D/A converters 1300.1–1300.3 as an audio digital signal for every two channels.

Figure 12:
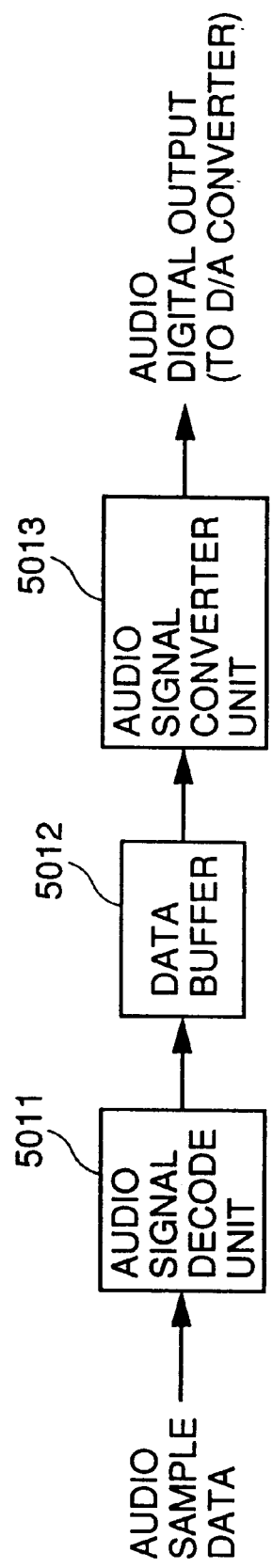
FIG. 12 is a schematic block diagram showing a structure of a conventional audio decoder 5000.
Figure 13:
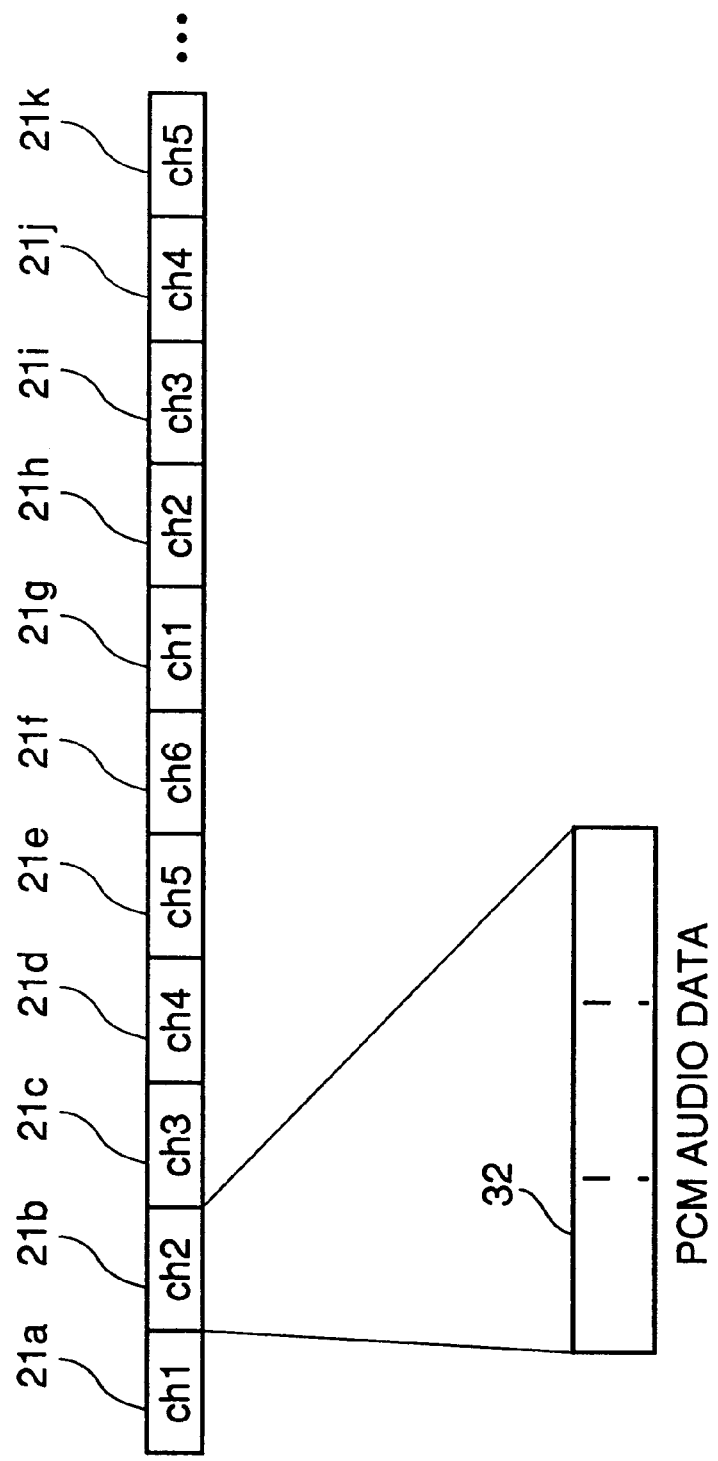
FIG. 13 is a schematic block diagram showing a structure of audio sample data output from audio signal decode unit 5011.
Figure 14:
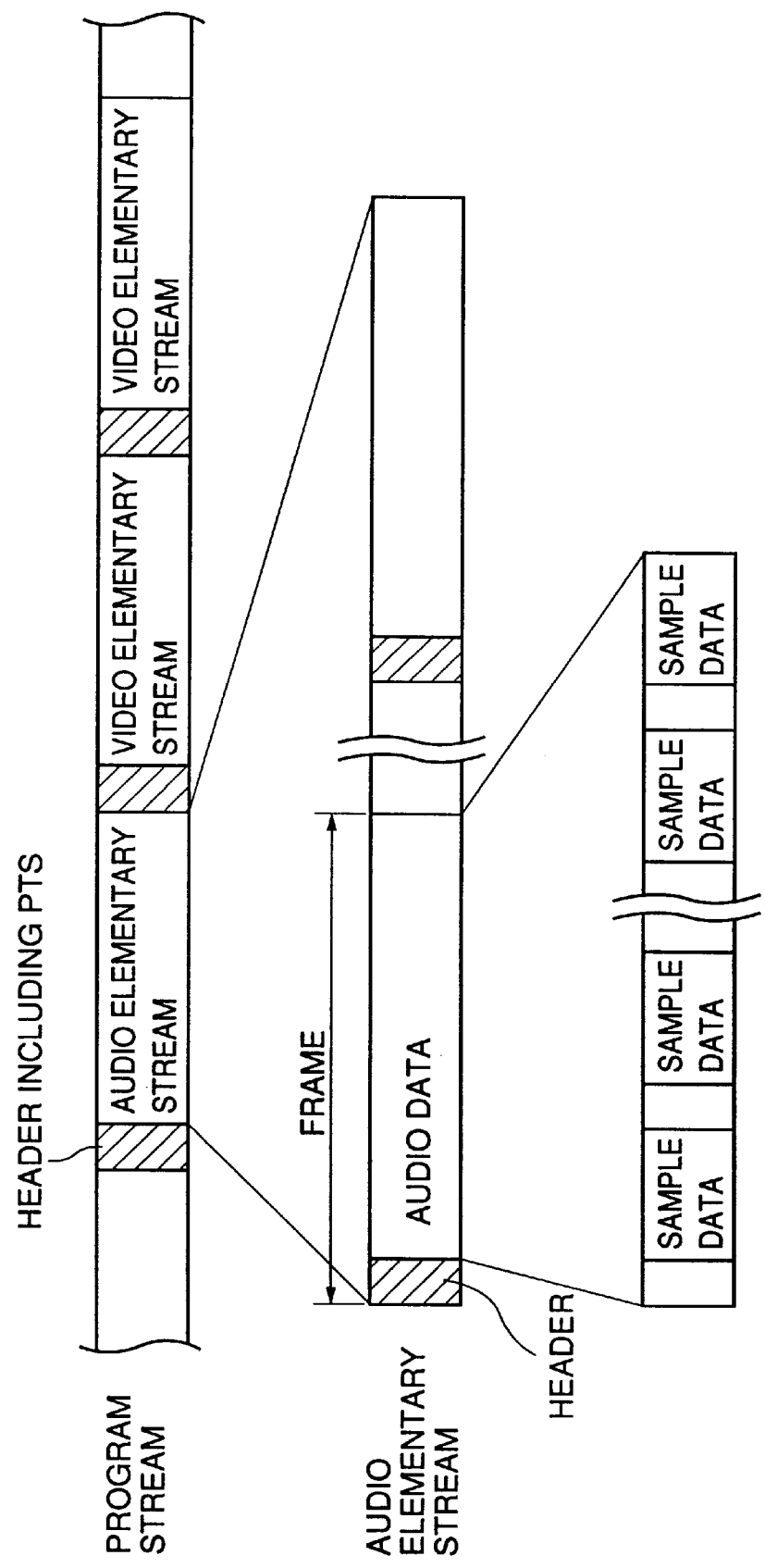
FIG. 14 is a diagram to describe a structure of a program stream which is a signal read out from a digital audio video recording medium.

In correspondence to the conventional audio signal decode apparatus 5000 of FIG. 12, CPU 1006 corresponds to audio signal decode unit 5011, SDRAM interface unit 1014 and SDRAM 1016 correspond to data buffer 5012, and audio signal converter unit 1013 corresponds to audio signal converter unit 5013.

The present invention is not limited to the above-described audio video signal decode apparatus 1000 having a structure receiving audio sample data read out from a recording medium such as a DVD. Audio video signal decode apparatus 1000 may have a structure in which audio sample data is received through data communication, for example.

Although audio video signal decode apparatus 1000 is implemented with SDRAM 1016 that operates as a buffer provided externally, a memory corresponding to SDRAM 1016 can be formed integrally on the same chip.

Also, digital NTSC/PAL encoder 1200 and audio D/A converters 1300.1–1300.3 can be integrated on one chip. Furthermore, a structure in which front end unit 1002 is also integrated on one chip can be provided.

Figure 2A:
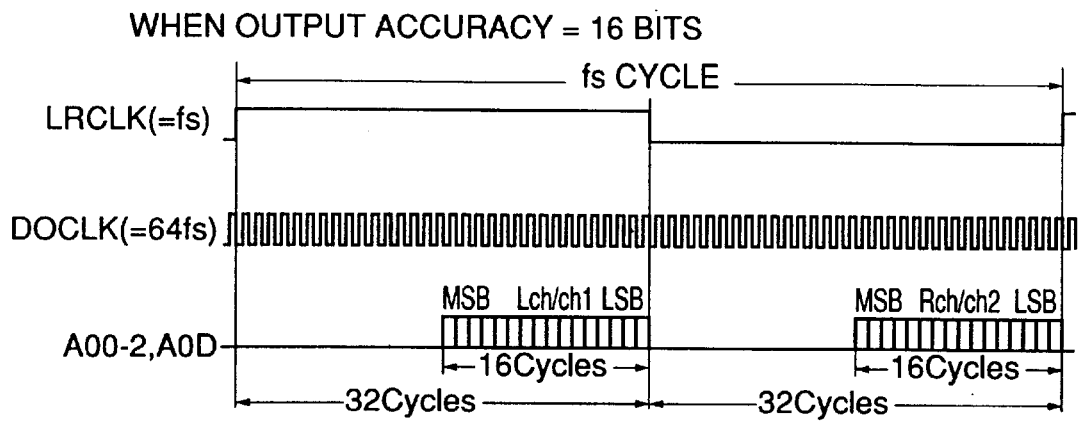
FIGS. 2A, 2B and 2C are timing charts to describe the standard of digital signals having the output accuracy of 16 bits, 20 bits and 24 bits, respectively, output from an audio signal converter unit 1013.
Figure 2B:
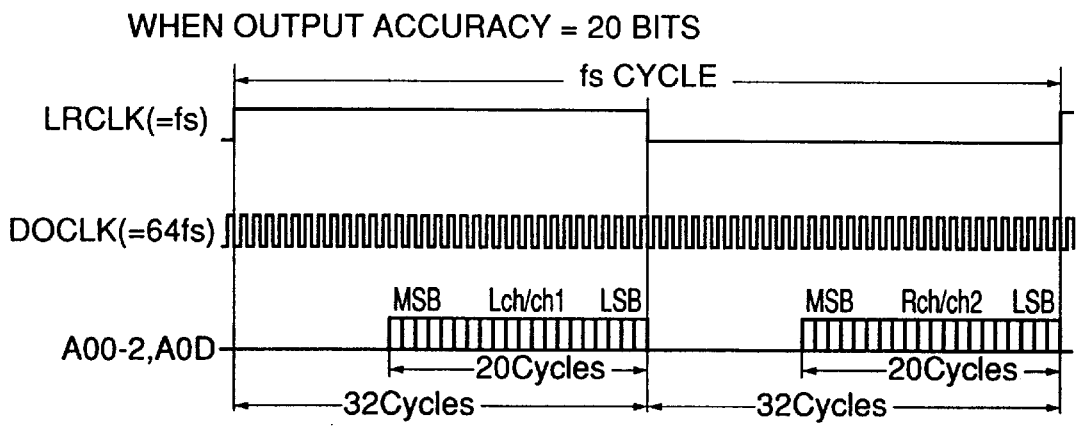
Figure 2C:
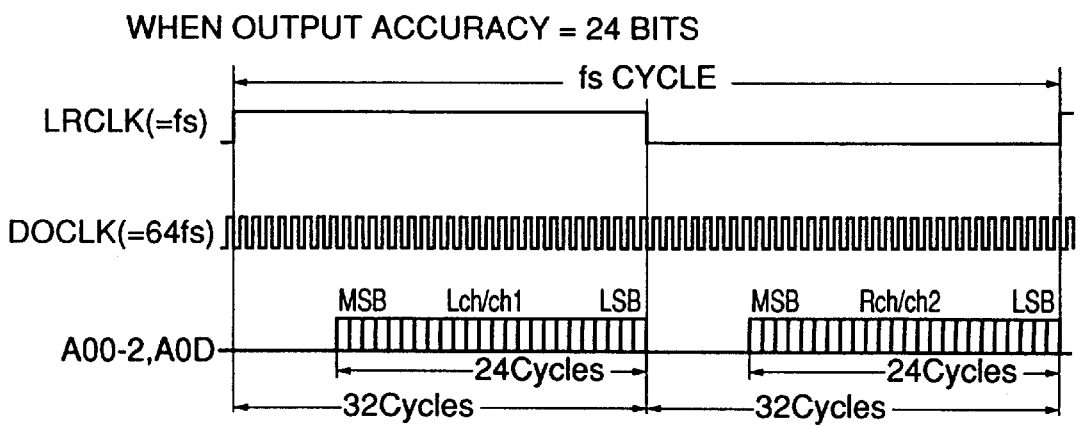

FIGS. 2A–2C are timing charts to describe the standard (EIAJ system) of a digital signal output from audio signal converter unit 1013.

FIG. 2A corresponds to the case where the quantizing accuracy is 16 bits. In the 32 cycles, L channel data and R channel circuit divided by an LRCLK signal are continuously applied from audio signal converter unit 1013 to audio D/A converter 1300.1.

Similarly, data of two channels are applied to the other audio D/A converters 1300.2 and 1300.3.

In the latter 16 cycles of the 32 cycles where signal LRCLK is at an H level, digital data is applied to audio D/A converter 1300.1.

Similarly, at the latter 16 cycles of the 32 cycles where signal LRCLK is at an L level, an audio digital signal is applied to audio D/A converter 1300.1.

FIG. 2B corresponds to the case where the quantizing accuracy is 20 bits. FIG. 2C corresponds to the case where the quantizing accuracy is 24 bits.

The same description for FIG. 2A applies to FIGS. 2B and 2C provided that the number of cycles of the output digital data is 20 cycles and 24 cycles, respectively.

As mentioned before, the quantizing accuracy may change dynamically during the reproduction period in a DVD and the like.

The signal applied from front end unit 1002 to audio video signal decode apparatus 1000 in FIG. 1 has a great amount of video signal information. Therefore, the audio signal is applied to audio video signal decode apparatus 1000 intermittently.

In the so-called multistory structure according to the DVD specification, there is a data structure in which the reproduced story of the audio image information branches partway. In such a case, there may be a gap in the audio signal at the branching point of the story.

It becomes necessary to detect the time point from which the synchronizing operation of the audio output is to be recommenced when there is a gap in an audio signal, as will be described hereinafter.

Figure 3:
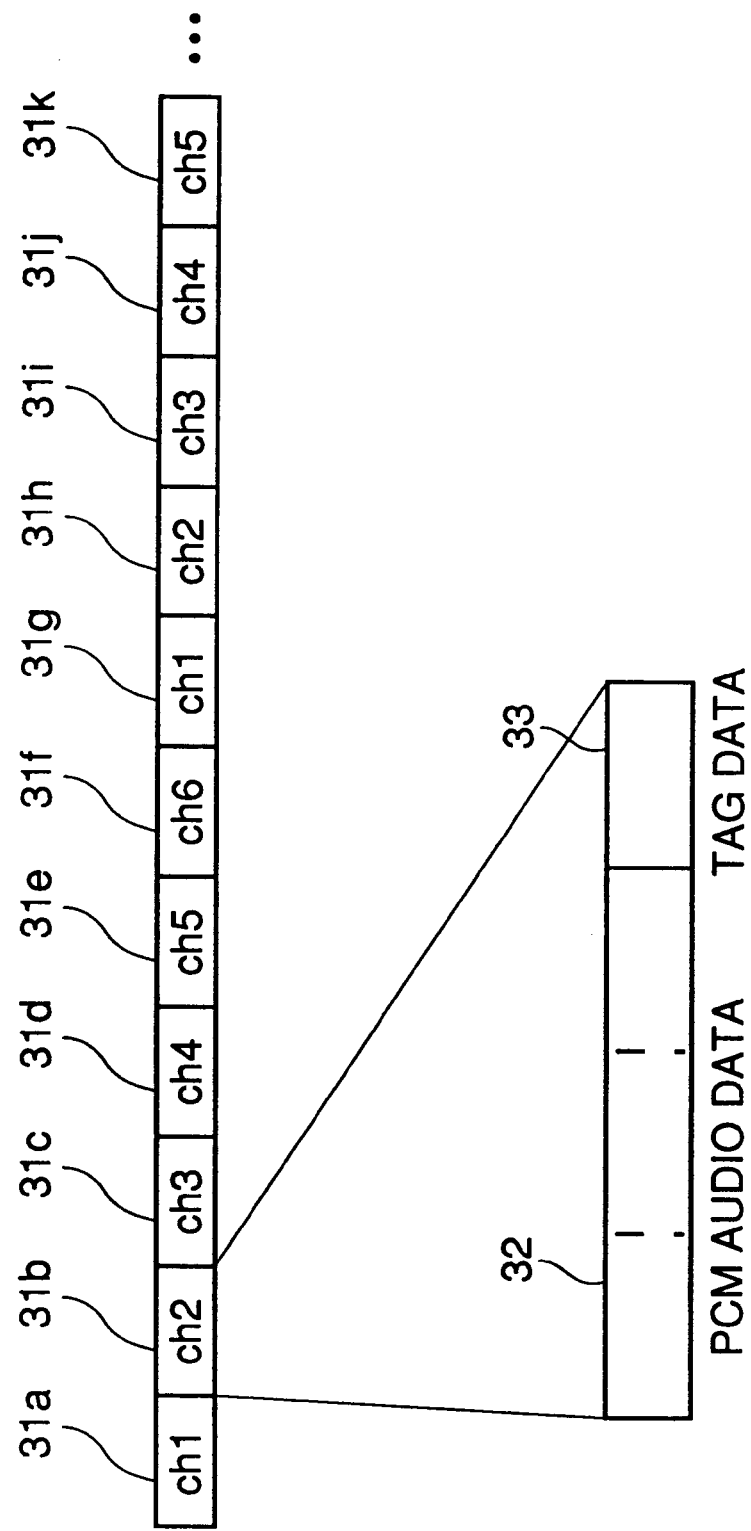
FIG. 3 is a schematic diagram of a structure of PCM audio data output from a CPU 1006.

FIG. 3 is a schematic diagram to describe the structure of PCM audio data output from CPU 1006 in audio video signal decode apparatus 1000 of the present invention.

Referring to FIG. 3, each of audio sample data 31a–31k represents audio data of one channel of one audio sample.

Each of audio data 31a–31k includes PCM audio data 32 and tag data 33 added thereto. In FIG. 3, the broken line implies the boundary of the data byte. In the example of FIG. 3, each audio data includes PCM audio data 32 of 3 bytes and tag data 33 of 1 byte.

The following Table 1 shows an example of data included in tag data 33.

TABLE 1

| Bit Position | Interpretation of Bit Field |
| --- | --- |
| 7-4 | Output Channel Information |
| 3-2 | Output Word Length Information |
| 1 | Audio Frame Head Designation |
| 0 | Error Flag |

In the tag data of one byte, the 0th bit indicates the error flag. The first bit indicates the audio frame head representation. The second and third bits indicate the output word length (quantizing accuracy) information. The fourth to seventh bits include information of the output channel.

Figure 4:
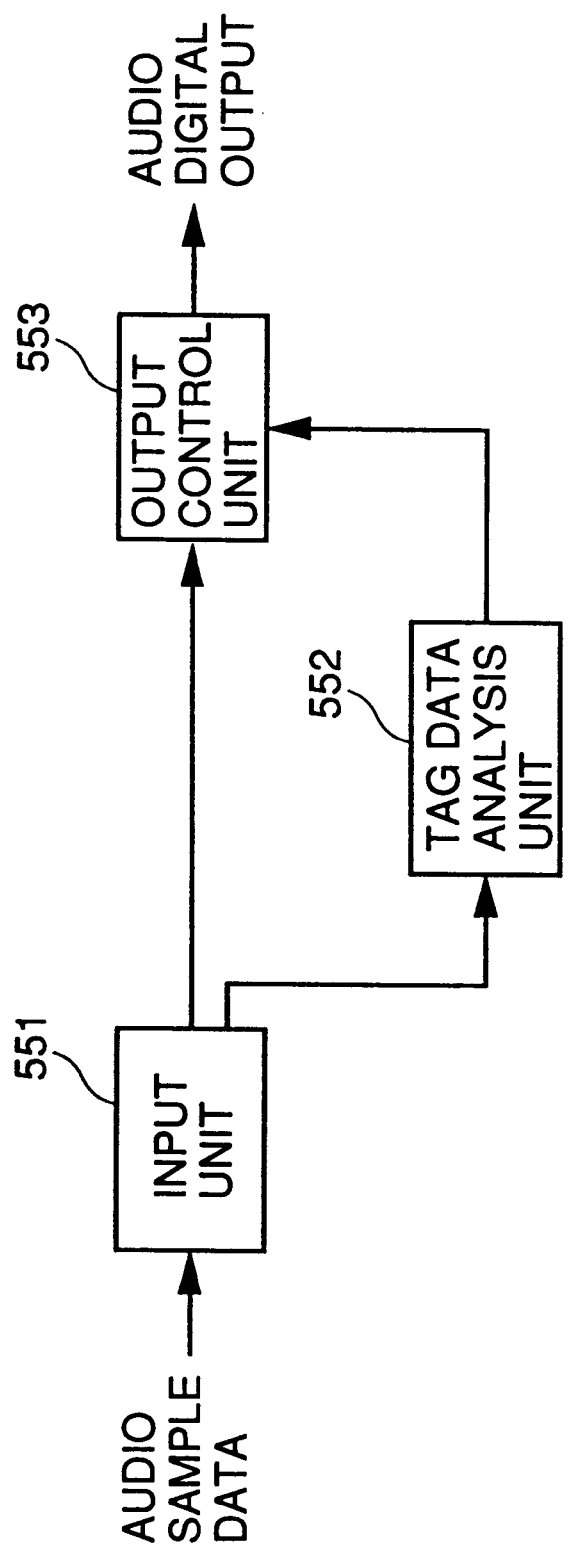
FIG. 4 shows a structure of audio signal converter unit 1013 that outputs digital audio data.

FIG. 4 corresponds to one component of audio video signal decode apparatus 1000 of FIG. 1. FIG. 4 shows the structure of audio signal converter unit 1013 that provides a digital audio data output.

An input unit 551 receives audio sample data to divide the same into PCM audio data 32 and tag data 33.

PCM audio data 32 is applied to an output control unit 553. Tag data 33 is applied to a tag data analysis unit 552. Tag data analysis unit 552 analyzes the received tag data 33 to provide an output control signal to output control unit 553. When output channel information is included in tag data 33, tag data analysis unit 552 refers to the channel information in tag data 33 divided from the audio sample to provide the designation information of the output channel per audio sample to output control unit 553.

Output control unit 553 can switch the output channel on an audio sample basis independent of what order the audio sample data has been transferred to the audio output unit.

More specifically, in the case where a recover operation (resynchronization operation) is applied with respect to an error, if any, in a certain audio sample data, the output channel per each audio sample from output control unit 553 is switched by adjusting the resynchronization timing in units of sample data.

Also, when sample frequency information is included in tag data 33, tag data analysis unit 552 refers to the sample frequency in tag data 33 divided from the audio sample to provide the output sample frequency designation information per audio sample to output control unit 553. Output control unit 553 can select the output sample frequency in units of audio sample.

In other words, when sample frequency fs changes for each audio sample data, this dynamic change in the attribute of the audio data can be accommodated.

When PCM audio output word length information is included in tag data 33, tag data analysis unit 552 refers to the PCM audio output word length information in tag data 33 divided from the audio sample to provide the output word length selection designation of the PCM audio data to output control unit 553. Output control unit 553 can select the output word length of the PCM audio data. In other words, when the quantizing accuracy differs for each audio sample data, this dynamic change in the quantizing accuracy can be accommodated.

When PCM audio data error information is included in tag data 33, tag data analysis unit 552 refers to the PCM audio data error information in tag data 33 divided from the audio sample to provide the PCM audio data mute select designation to output control unit 553. Output control unit 553 can select a muting operation for the PCM audio data output.

In the case where there is an error in the audio sample data, a mute operation is selected during the period in which the relevant audio sample data is to be output. As to the proper audio sample data that is input sequentially, the output operation is resumed. Therefore, the dynamic change in the error of the audio sample data can be accommodated.

When audio frame head information is included in tag data 33, tag data analysis unit 552 refers to the audio frame head information in tag data 33 divided from the audio sample to provide control for resynchronization. When resynchronization (restart) must be effected after a temporary reproduction cessation due to occurrence of an error, tag data analysis unit 552 searches for the audio frame head information to indicate the restart of reproduction from the PCM audio data attached with the audio frame head information.

In response, output control unit 553 resumes reproduction from the PCM audio data to which the audio frame head information is attached.

Figure 5:
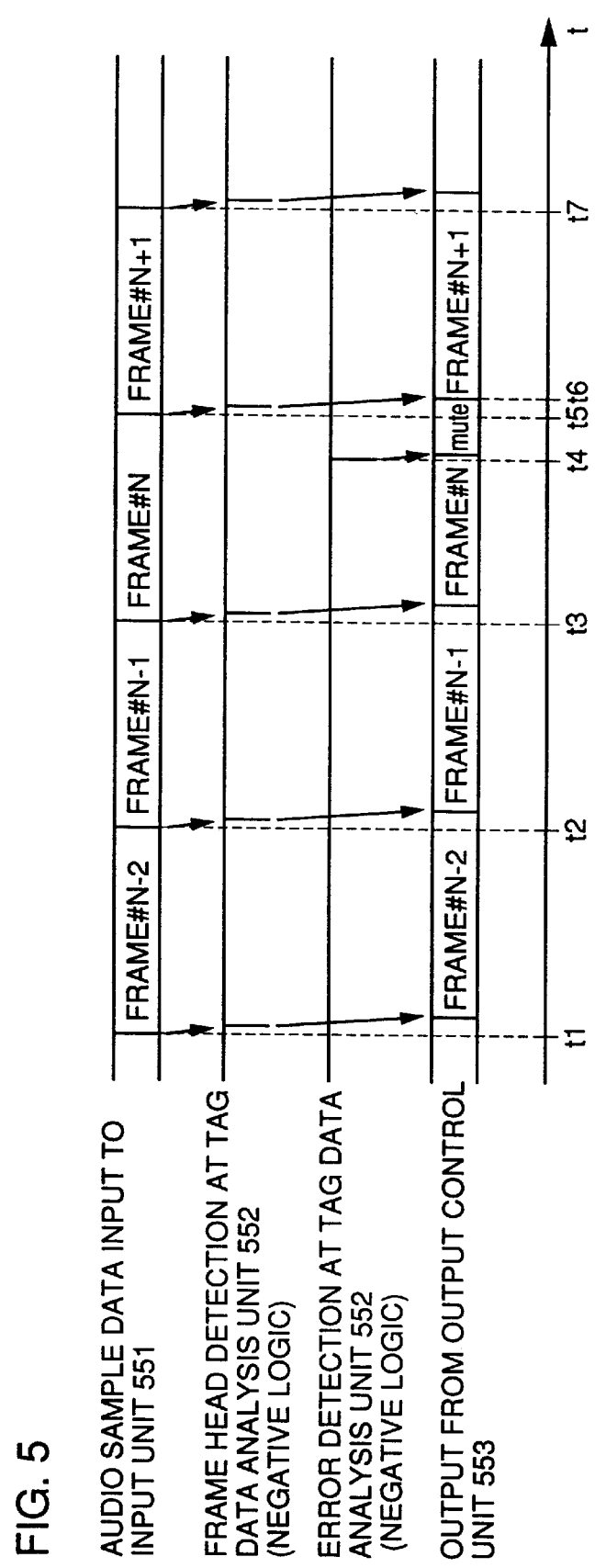
FIG. 5 is a timing chart to describe the resynchronization operation of audio video signal decode apparatus 1000 in the case of error occurrence.

FIG. 5 is a timing chart to describe the resynchronization operation of audio video signal decode apparatus 1000 when the above-described error occurs.

At time t1, t2 and t3, frame data #N−2, #N−1 and #N are input to input unit 551.

When there is an error in the frame information input at time t3, tag data analysis unit 552 detects the error at time t4. In response to this error detected result, output control unit 553 is designated a mute operation to cease the data output operation.

Frame information #N+1 input at time t5 is absent of error information and includes audio frame head information. In response to the designation from tag data analysis unit 552, the output operation of frame information #N+1 is resumed by output control unit 553 at time t6.

Accordingly, the synchronized state of the signals output from output control unit 553 is maintained. The synchronization between the video output and the audio output is maintained. Thus, the problem of deviation in the synchronization of the reproduction operation between the video signal and the audio signal when an audio video signal of a DVD is decoded is eliminated.

The resynchronization point is set in units of audio frame because cooperation with the error process and the recover process from the error included in the decoding process is facilitated when the decode process is carried out per audio frame as in the AC-3 or MPEG audio.

It is to be noted that the resynchronization point does not necessarily have to be at the head of the audio frame. For example, the audio sample immediately succeeding the audio gap defined in the DVD can be set as the resynchronization point. The tag data may have a bit field of indicating that it is the sample right after the audio gap. Alternatively, when the video decoder is realized on the same integrated circuit, the audio sample can be divided into the length identical to that of the video access unit such as one video frame, and use the head audio sample of that unit as the resynchronization point.

In FIG. 3, audio sample data 31a–31k correspond to a structure in which samples output at the same time are transferred together.

Figure 6:
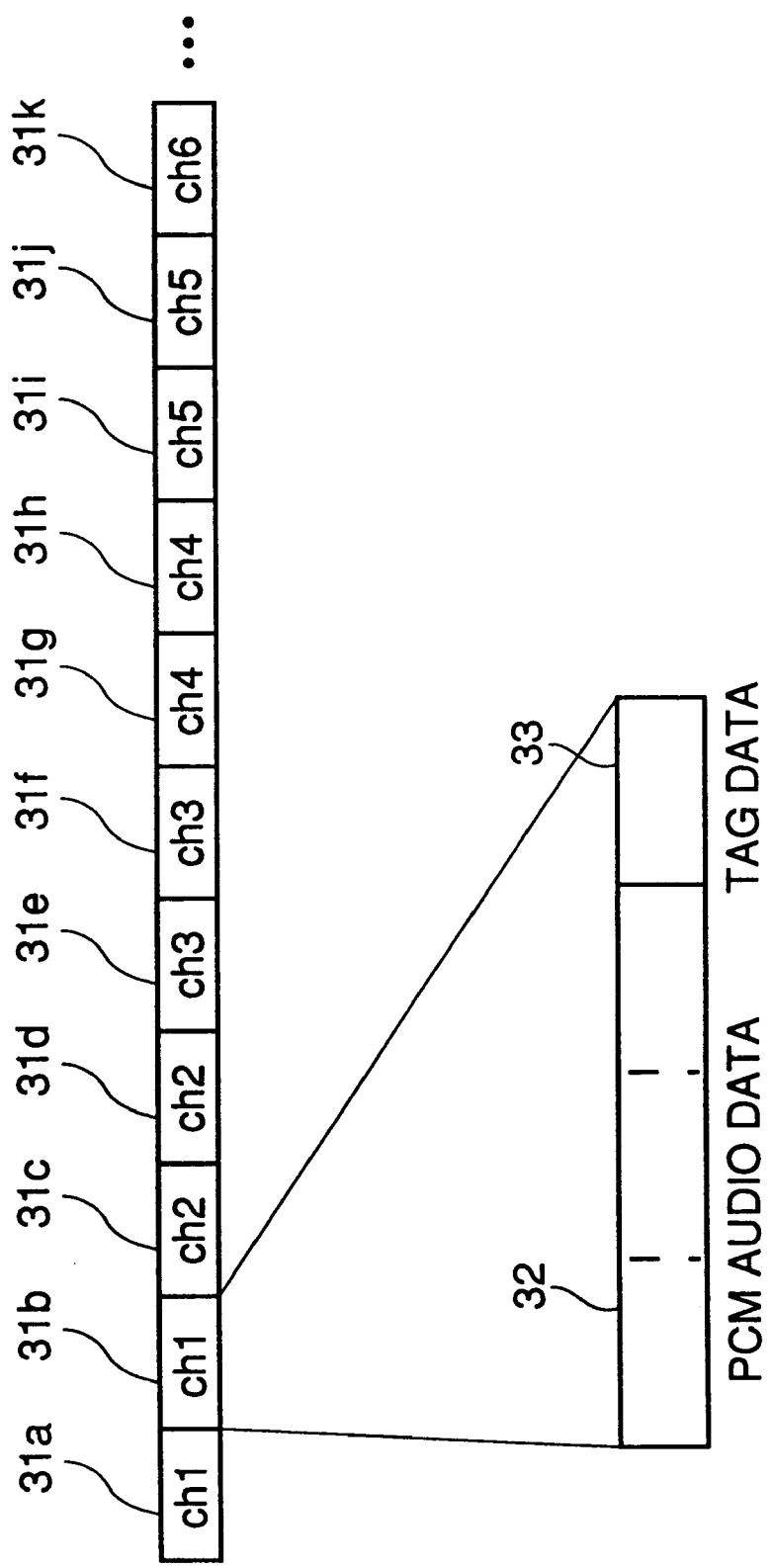
FIG. 6 is a schematic diagram showing another structure of a sample data output method.

In contrast, FIG. 6 shows another structure of the sample data output method. A predetermined number of samples output at the same channel can be transferred together as shown in FIG. 6.

FIGS. 3 and 6 correspond to the structure in which tag data 33 is transferred after PCM audio data 32. A structure in which tag data 33 is transferred prior to PCM audio data 32 can be employed.

The word length of PCM audio data 32 and tag data 33 are variable depending upon the system.

In the DVD and the like, the output word length is 16 bits, 20 bits, 24 bits, or the like as mentioned before. By obtaining a PCM audio data region of 8×3 =24 bits, the output word length can be changed while maintaining the data length of the PCM audio data and the data length of the tag data at the same values.

Although FIGS. 3 and 6 correspond to a structure in which tag data 33 is applied to all the audio sample data, not all the audio sample data necessarily have to be applied tag data indicating the attribute.

For example, a structure in which tag data 33 indicating the contents of the attribute can be applied to a particular audio sample data such as at only the beginning of an audio frame. In this case, audio output unit 1013 can identify whether the tag data is valid or not by including a tag data valid designation flag in the data region (1 byte) where the tag data is added.

More specifically, in the structure where all sample data have the data length of 8×4=32 bits and tag data 33 indicating the attribute is added only to a particular audio sample data as described above, a structure can be implemented in which audio video signal decode apparatus 1000 outputs data without carrying out a tag data analysis process for the sample data indicated to be absent of tag data according to the tag data valid designation flag and that carries out tag data analysis for only the sample data added with tag data according to the tag data valid designation flag.

TABLE 2

Contents of Tag Data (When there is a tag data valid designation flag)

| Bit Position | Interpretation of Bit Field |
| --- | --- |
| 7-4 | Output Channel Information |
| 3-2 | Output Word Length Information |
| 1 | Audio Frame Heading Designation |
| 0 | Tag Data Valid Designation Flag |

Figure 7:
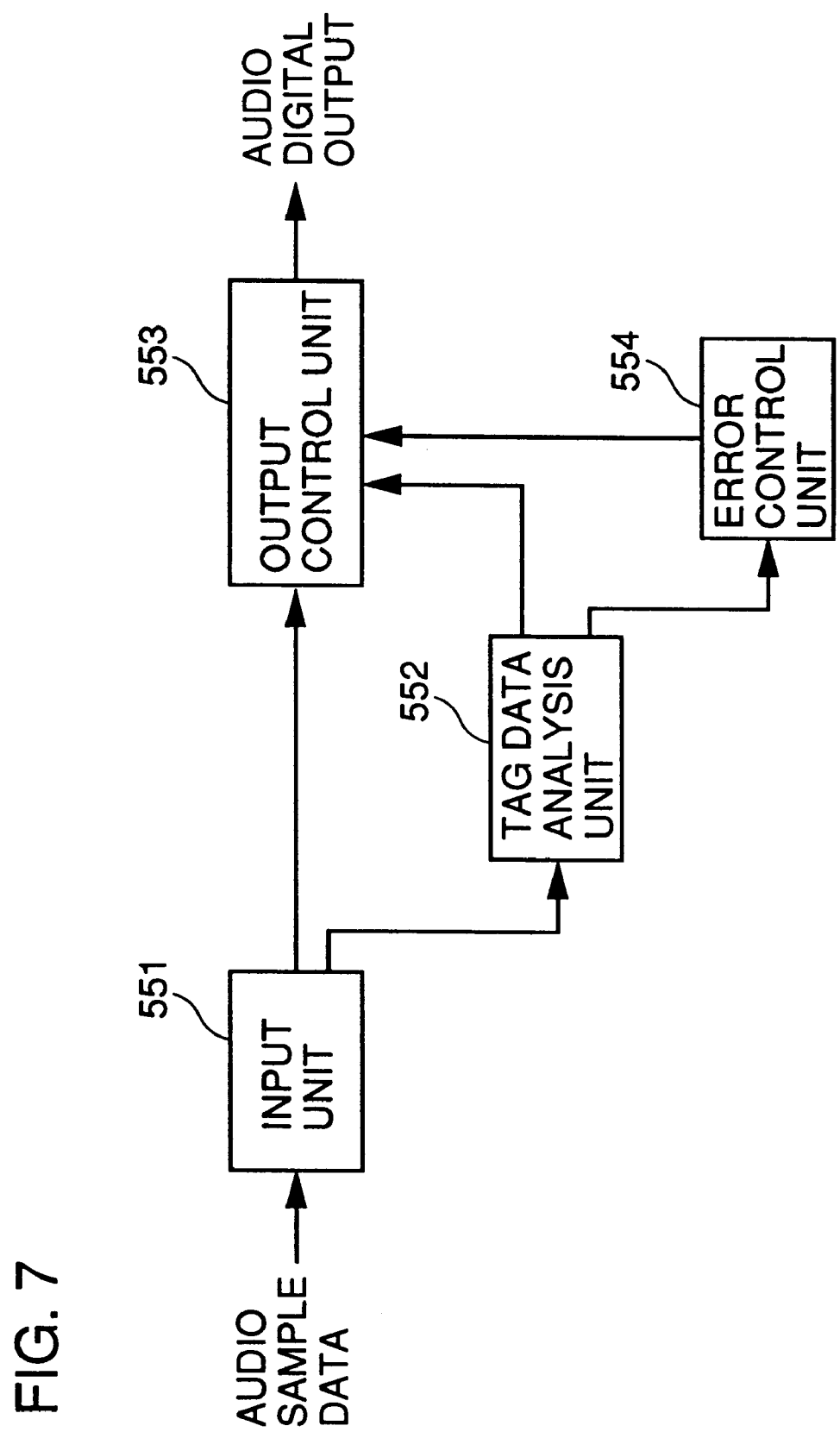
FIGS. 7 and 8 are schematic block diagrams showing other structures of audio signal converter unit 1013.
Figure 8:
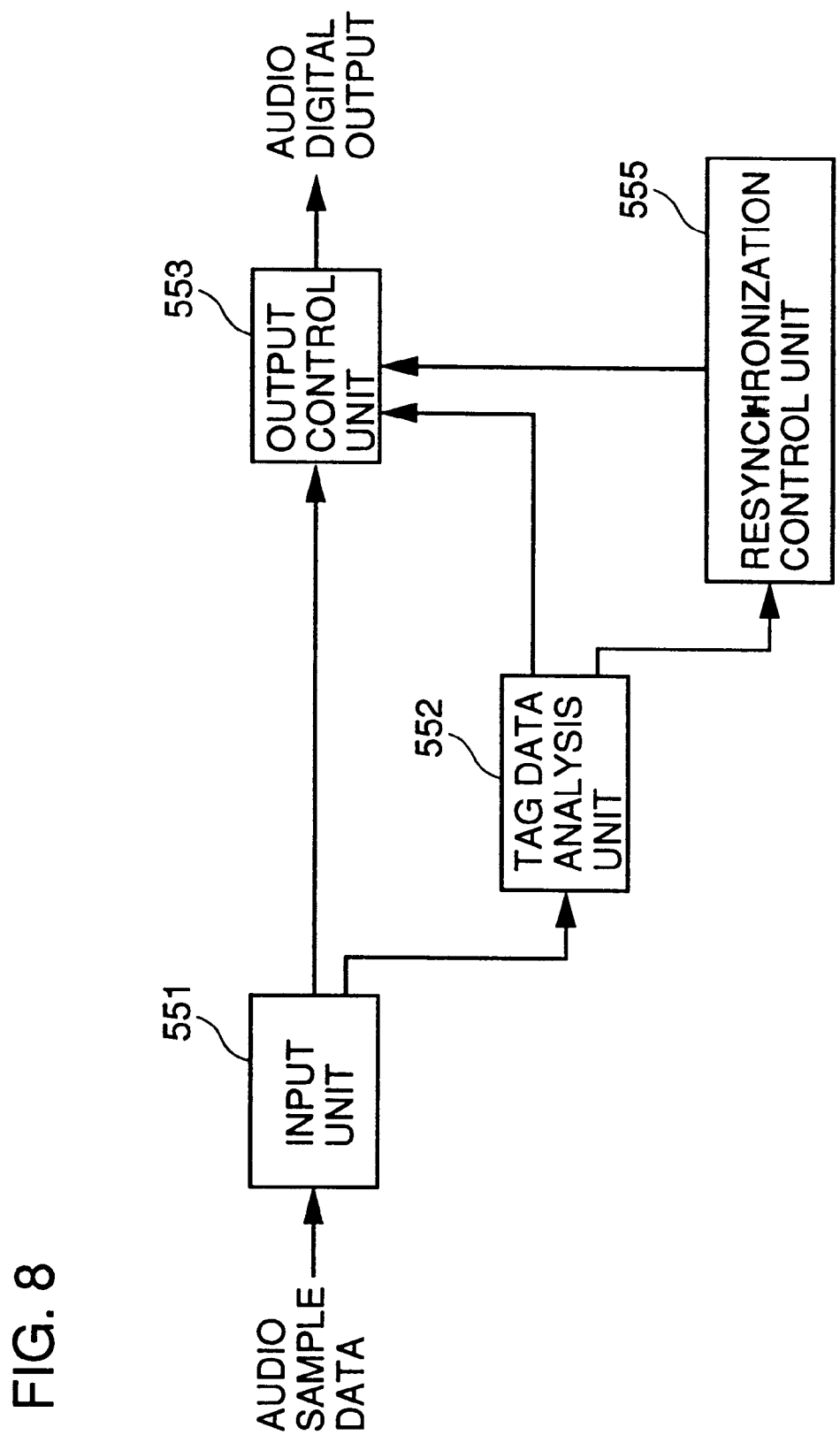

The above description corresponds to an audio signal converter unit 1013 having the structure shown in FIG. 4. However, the structure of the audio signal converter unit is not limited to that of FIG. 4. FIGS. 7 and 8 are schematic block diagrams showing other structures of audio signal converter unit 1013. A structure in which error control unit 554 is provided as an independent unit as shown in FIG. 7 or in which a resynchronization control unit 555 is provided as an independent unit as shown in FIG. 8 can be employed.

Second Embodiment

Figure 9:
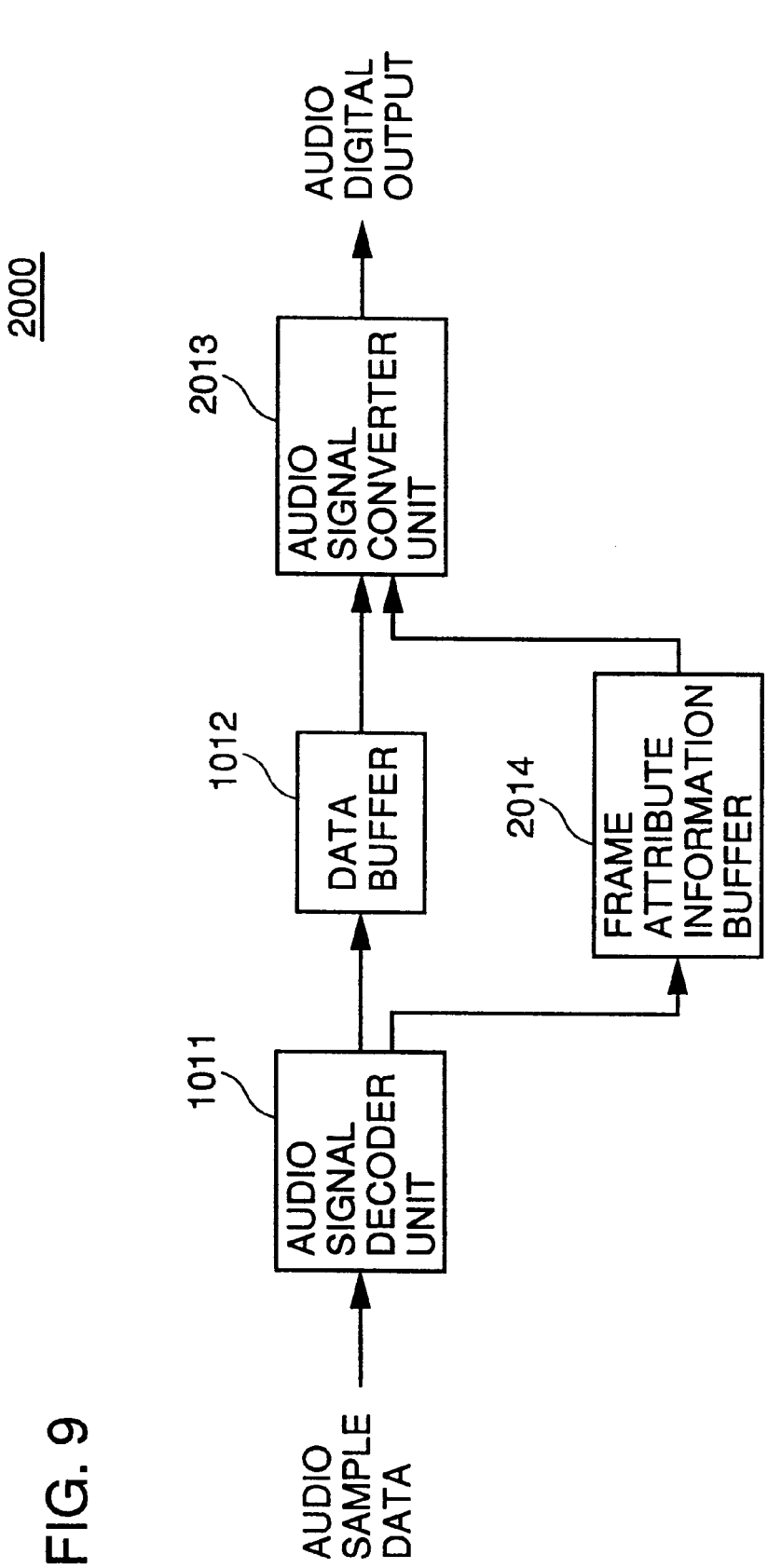
FIG. 9 is a schematic block diagram showing an audio video signal decode apparatus 2000 of a second embodiment of the present invention.

FIG. 9 is a schematic block diagram showing a structure of an audio video signal decode apparatus 2000 according to a second embodiment of the present invention.

Audio video signal decode apparatus 2000 of the second embodiment differs in structure from audio video signal decode apparatus 1000 of the first embodiment in that a frame attribute information buffer 2014 is provided and an audio signal converter unit 2013 is controlled according to the tag data stored in data buffer 1012 and frame attribute information stored in frame attribute information buffer 2014.

More specifically, a region corresponding to frame attribute information buffer 2014 is newly provided in SDRAM 1016 according to the structure of audio video signal decode apparatus 1000 of FIG. 1. Frame attribute information buffer 2014 does not necessarily have to be provided in SDRAM 1016. A structure in which an independent buffer is additionally provided in audio video signal decode apparatus 1000 can be employed.

Similar to the structure of audio video signal decode apparatus 1000 of the first embodiment, audio video signal decode apparatus 2000 of the second embodiment includes a stream interface unit 1004 and a CPU 1006 in audio signal decode unit 1011. Data buffer 1012 has a structure corresponding to a predetermined region of SDRAM interface unit 1014 and SDRAM 1016.

Frame attribute information is sent from audio decode unit 1011 to audio converter unit 2013 via frame attribute information buffer 2014. Frame attribute information buffer 2014 is a FIFO (first in first out) type buffer to temporarily store the information of audio sample data stored in data buffer 1012 per the access unit. For example, the contents of the frame attribute information are formed as set forth in the following with the access unit as the audio frame.

TABLE 3

Contents of Frame Attribute Information

| Byte Position | Meaning |
| --- | --- |
| 4-1 | PTS (Presentation Time Stamp) |
| 0 | Output Valid Designation |

In the previous first embodiment, tag data is applied for each audio sample data. In the second embodiment, the frame attribute information as shown in Table 3 is included in the header of each audio frame corresponding to the access unit.

It is appreciated from Table 3 that the 0th byte of the frame attribute information includes information indicating the output valid designation. The first to fourth bytes include the PTS (Presentation Time Stamp).

Audio sample data shown in FIG. 1 is transferred to data buffer 1012 of FIG. 9. Each audio sample data is formed of PCM audio data 32 and tag data 33 attached thereto.

Figure 10:
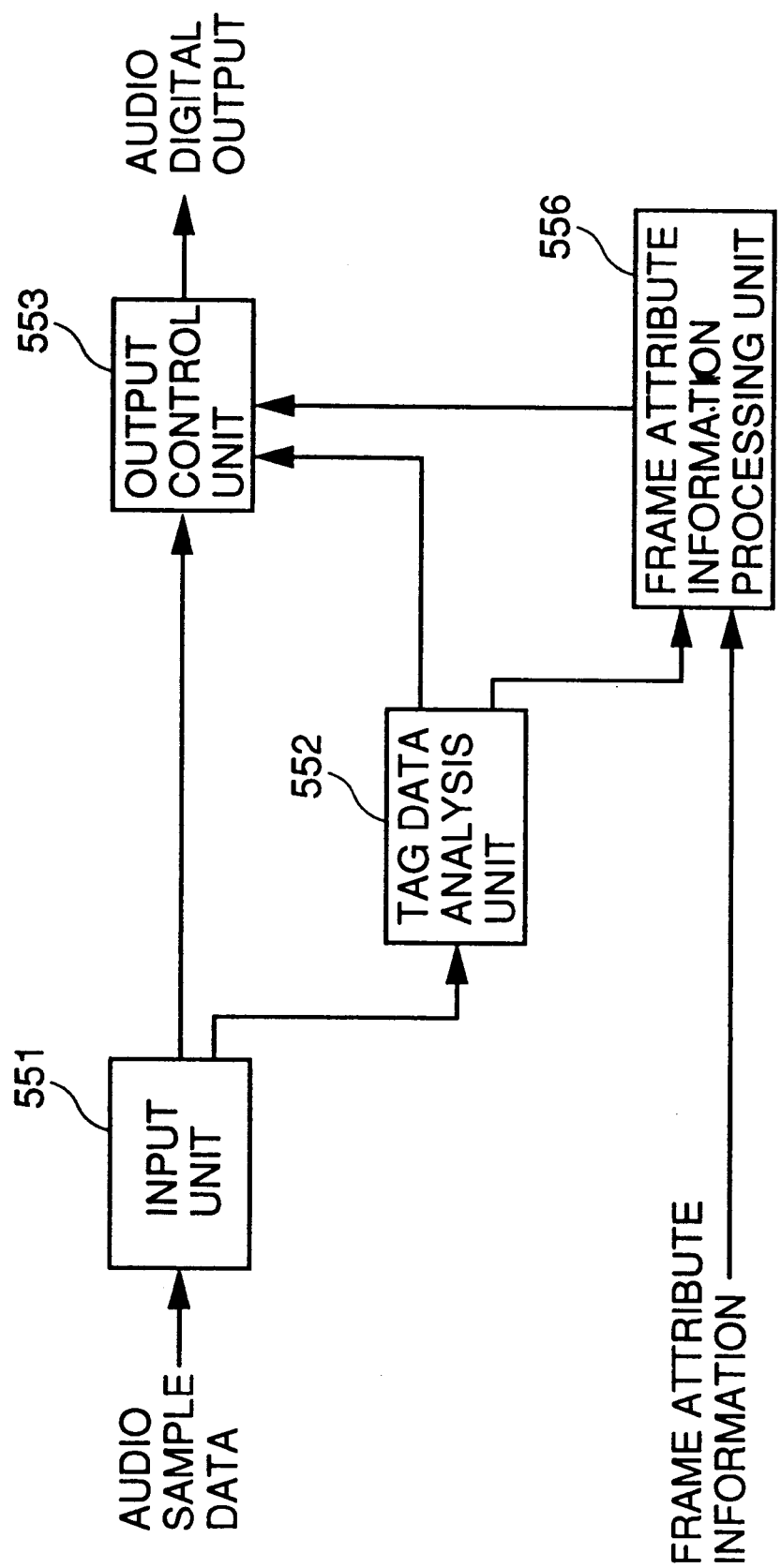
FIG. 10 is a schematic block diagram to describe a structure of an audio signal converter unit 2013.

FIG. 10 is a schematic block diagram to describe the structure of audio signal converter unit 2013 of FIG. 9.

Audio signal converter unit 2013 receives frame attribute information from the audio decode unit through the frame attribute information buffer. When audio frame head information is included in tag data 33, tag data analysis unit 552 refers to the audio frame head information in tag data 33 divided from the audio sample and the resynchronization start condition (PTS) included in the frame attribute information to control the resynchronization. When resynchronization (restart) must be effected after a temporary reproduction cessation due to error occurrence, tag data analysis unit 552 searches for the audio frame head information to designate reproduction resumption from the PCM audio data attached with the audio frame head information associated with the PTS according to the resynchronization start condition included in the frame attribute information. Output control unit 553 responds to these designation to restart the reproduction at the proper restore timing from the PCM audio data attached with the audio frame head information according to the PTS value.

Figure 11:
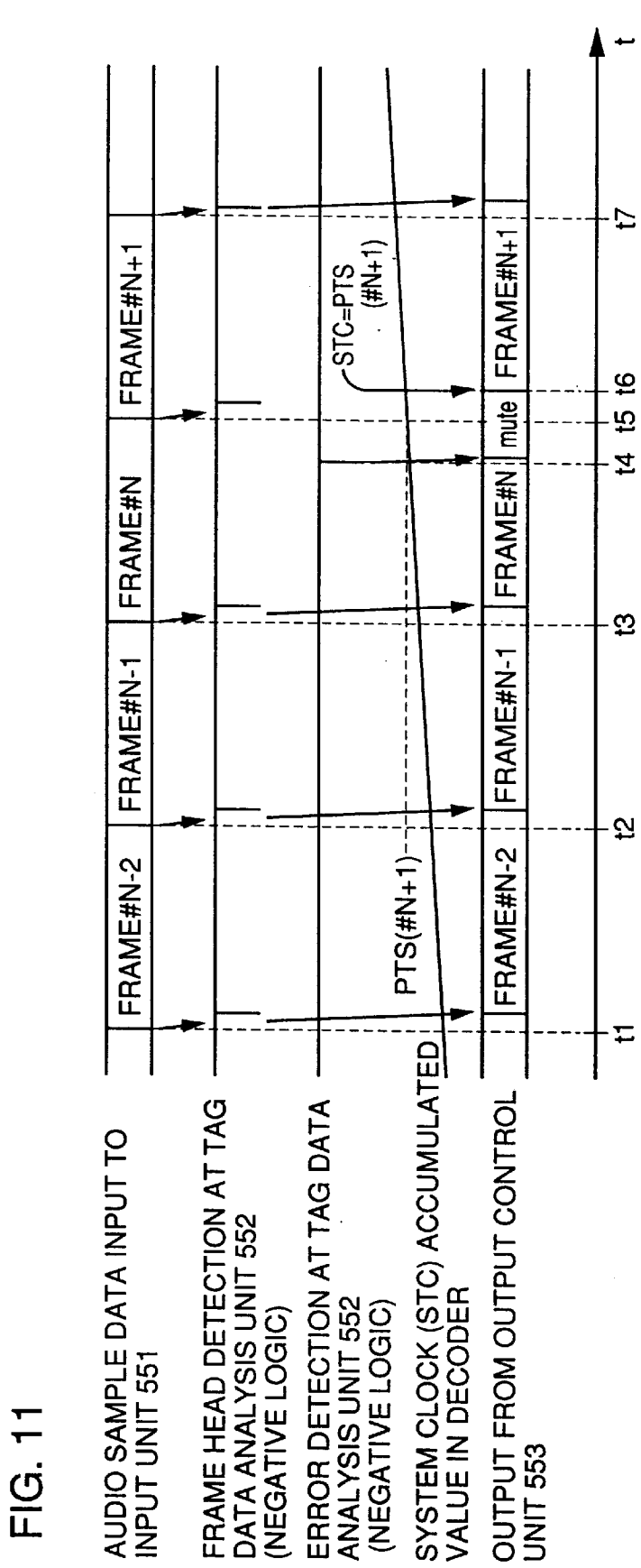
FIG. 11 is a timing chart to describe the operation of audio video signal decode apparatus 2000.

FIG. 11 is a timing chart to describe the operation of audio video signal decode apparatus 2000 when such a restart operation of reproduction is to be carried out.

At time t3, there is an error in audio sample data of frame #N applied to input unit 551. At time t4, error information is detected at tag data analysis unit 553.

Then, the audio sample data of frame #N+1 is input at time t5. This audio sample data includes audio frame head information and PTS. According to the detected result of the audio frame head information applied from tag data analysis unit 552 and the PTS value from frame attribute information processing unit 556, output control unit 553 resumes the output operation of frame #N+1 at time t6 where the accumulated value of system clock STC in the decoder matches the PTS value of frame #N+1.

The resynchronization point does not necessarily have to be the beginning of the audio frame in the above cases. For example, the audio sample right after the audio gap can be set as the point of resynchronization. The bit field in the tag data corresponding to indication of a sample right after the audio gap can include audio gap information (VOB_A_STP_PTM or VOB_A_GAP_LEN) defining the DVD in the frame attribute information. In this case, various parameters described in the previous first embodiment can be included as the contents of the tag data.

Additionally, a structure in which the index of the frame attribute information is included as the contents of tag data can be implemented.

When the tag data is absent of the index of frame attribute information, update of the read pointer of the frame attribute information buffer is effected by the head designation at the access unit which is the unit of frame attribute information or an alternative update designation.

When the tag data includes index of the frame attribute information, update of the read pointer of the frame attribute information buffer can be effected while referring to the frame attribute information index in the tag data.

By implementing a structure in which the operation of output control unit 553 is controlled according to the frame attribute information, the PTS value and the audio frame number can be delivered in the audio signal conversion unit. Therefore, resynchronization can be applied properly when there are data of a plurality of audio frames in audio video signal decode apparatus 2000.

With only the tag data, there is a possibility of indefiniteness in which frame is to be reproduced at which system clock timing when there are frame information corresponding to a plurality of PTS values. A resynchronization operation can be carried out properly by referring to both the tag data and the frame attribute information.

In the above description, the term of "audio frame" is not limited to an audio frame defined as the AC-3 and MPEG audio. In general, "audio frame" implies the group of audio sample data including predetermined plurality of audio sample data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A decode apparatus to apply a decode process on an audio digital data stream transmitted in units of frame data including a plurality of coded sample data, comprising:

an interface unit receiving said audio digital data stream;

a decoder unit sequentially decoding said audio digital data stream to add tag data indicating an attribute of said sample data to said sample data;

a storage unit to receive and buffer decoded data; and an audio signal converter unit receiving data from said storage unit to convert the received data into a digital signal that is convertible into an audio analog signal by digital/analog conversion, said audio signal converter unit controlling timing of data output according to said tag data.

2. The decode apparatus according to claim 1, wherein said audio signal converter unit comprises an input unit receiving data from said storage unit to divide said data into said tag data and said sample data, a tag data analysis unit reading out contents of said tag data from an output of said input unit, and an output control unit responsive to an output from said tag data analysis unit to convert said sample data into a digital signal that can be converted into an audio analog signal by digital/analog conversion, and controlling output timing of said digital signal.

3. The decode apparatus according to claim 2, wherein data output from said decoder unit includes a first data region having a first predetermined bit length, and including said sample data subjected to decoding, and a second data region having a second predetermined bit length, and including said tag data.

4. The decode apparatus according to claim 2, wherein output data from said decoder unit includes a first data region having a first predetermined bit length, and including said sample data subjected to decoding, and a second data region having a second predetermined bit length, and including said tag data and a flag designating whether said tag data is valid or invalid.

5. The decode apparatus according to claim 2, wherein said audio digital data stream is multichannel audio data, wherein said tag data includes audio channel information, said output control unit distributing said sample data into a plurality of output destinations respectively corresponding to channels of the multichannel according to said audio channel information.

6. The decode apparatus according to claim 2, wherein said tag data includes information indicating whether said sample data is at the head of said frame data.

7. The decode apparatus according to claim 2, wherein said tag data includes information indicating whether said sample data is data immediately succeeding an audio gap determined by an audio coding method with respect to said audio digital data stream.

8. The decode apparatus according to claim 2, wherein said tag data includes word length information of said sample data.

9. The decode apparatus according to claim 8, wherein said output control unit carries out data conversion into a digital signal that is convertible into an audio analog signal according to said word length information.

10. The decode apparatus according to claim 2, wherein said tag data includes sampling frequency information of said sample data.

11. The decode apparatus according to claim 2, wherein said tag data includes error information of said sample data.

12. The decode apparatus according to claim 11, wherein said output control unit determines recommence timing of data output according to said error information.

13. The decode apparatus according to claim 11, wherein said output control unit suppresses an output operation of data output according to said error information.

14. A decode apparatus to apply a decode process on an audio digital data stream transmitted in units of frame data including a plurality of coded sample data and including frame attribute data indicating an attribute of at least one said frame data, said decode apparatus comprising:

an interface unit receiving said audio digital data stream;

a decoder unit sequentially decoding said audio digital data stream to extract said frame attribute data and add tag data indicating the attribute of said sample data to said sample data;

a first storage unit to receive and buffer said frame attribute data from said decoder unit;

a second storage unit to receive and buffer decoded sample data and tag data; and an audio signal converter unit receiving data from said storage unit to convert the received data into a digital signal that is convertible into an audio analog signal by digital/analog conversion, said audio signal converter unit controlling timing of data output according to said frame attribute data and said tag data.

15. The decode apparatus according to claim 14, wherein said audio signal converter unit comprises an input unit receiving data from said second storage unit to divide the received data into said tag data and said sample data, a tag data analysis unit reading out contents of said tag data from an output of said input unit, a frame attribute information processing unit to analyze frame attribute information according to said frame attribute data from said first storage unit, and an output control unit converting said sample data into a digital signal that is convertible into an audio analog signal by digital/analog conversion, and controlling output timing of said digital signal, according to an output from said tag data analysis unit and said frame attribute information processing unit.

16. The decode apparatus according to claim 15, wherein said tag data includes information indicating whether said sample data is at the head of said frame data.

17. The decode apparatus according to claim 15, wherein said tag data includes index information indicating which frame a corresponding sample data belongs to.

18. The decode apparatus according to claim 15, wherein data output from said decoder unit includes a first data region having a first predetermined bit length, and including said sample data subjected to decoding, and a second data region having a second predetermined bit length, and including said tag data.

19. The decode apparatus according to claim 15, wherein output data from said decoder unit includes a first data region having a first predetermined bit length, and including said sample data subjected to decoding, and a second data region having a second predetermined bit length, and including said tag data and a flag designating whether said tag data is valid or invalid.

* * * * *